United States Patent [19]
Ward et al.

[11] Patent Number: 5,231,880
[45] Date of Patent: Aug. 3, 1993

[54] PRESSURE TRANSDUCER ASSEMBLY

[75] Inventors: Roger W. Ward, Park City; Robert B. Wiggins, Salt Lake City, both of Utah

[73] Assignee: Quartzdyne, Inc., Salt Lake City, Utah

[21] Appl. No.: 822,611

[22] Filed: Jan. 15, 1992

[51] Int. Cl.$^5$ .................. G01F 11/00; G01L 19/04
[52] U.S. Cl. .......................... 73/702; 73/708; 310/338; 374/143
[58] Field of Search ............... 73/702, 151, 708, 714, 73/152, 154, 702, 756, 862.59; 310/338; 374/143

[56] References Cited

U.S. PATENT DOCUMENTS

| | | | |
|---|---|---|---|
| 2,173,589 | 9/1939 | Mason et al. | 171/227 |
| 3,355,949 | 12/1967 | Elwood et al. | 73/708 |
| 3,561,832 | 2/1971 | Karrer et al. | 310/9.6 |
| 3,617,780 | 11/1971 | Benjaminson | 310/8.2 |
| 4,550,610 | 11/1985 | EerNisse | 73/702 |
| 4,660,420 | 4/1987 | EerNisse | 73/702 |
| 4,754,646 | 7/1988 | EerNisse et al. | 73/702 |
| 4,802,370 | 2/1989 | EerNisse et al. | 73/702 |
| 4,936,147 | 6/1990 | EerNisse | 73/702 |

OTHER PUBLICATIONS

Heising, Raymond, A., *Quartz Crystals for Electrical Circuits*, D. Van Nostrand Company, Inc. (1946), pp. 26 & 27.

Bechmann, et al., *Higher Order Temperature Coefficients of the Elastic Stiffnesses and Compliances of Alpha-Quartz*, Proceedings of the IRE, vol. 50, Aug. 1962, (excerpts).

Bottom, Virgil E., *Introduction to Quartz Crystal Unit Design*, Van Nostrand Reinhold Company, 1982, pp. 154 & 155.

Kaitz, Gwen, *Extended Pressure and Temperature Operation of BT-CUT Pressure Transducers*, Proceedings of the 38th Annual Frequency Control Symposium, 1984, pp. 245-250.

Kusters, et al., *Characteristics of Natural, Swept Natural, and Cultured X- and Z-Growth Quartz Material in High Temperature, High Stress Applications*, Proceedings of the 39th Annual Frequency Symposium, 1985, pp. 223-229.

EerNisse, Errol P., *Quartz Resonator Pressure Gauge: Design and Fabrication Technology*, Sandia Laboratories, Dec. 1978, pp. 1-43.

*Primary Examiner*—Donald O. Woodiel
*Attorney, Agent, or Firm*—Trask, Britt & Rossa

[57] ABSTRACT

A pressure transducer including a first pressure crystal, a second temperature crystal, a third reference crystal and associated electronics. All three crystals resonate in the thickness-shear mode.

20 Claims, 1 Drawing Sheet

PRESSURE TRANSDUCER ASSEMBLY

BACKGROUND OF THE INVENTION

1. Field of the Invention

The present invention relates to a quartz crystal resonator pressure transducer assembly suitable for use downhole in oil, gas, geothermal and other wells, at the wellhead, in industrial applications, for portable calibration devices and in laboratory applications. More specifically by way of example and not limitation, the invention relates to a piezoelectrically-driven temperature-compensated quartz crystal resonator pressure transducer assembly.

2. State of the Art

The general type of quartz crystal pressure transducer assembly as disclosed herein includes a first pressure sensitive quartz crystal resonator, a second temperature sensitive quartz crystal resonator, a third reference frequency quartz crystal resonator, and supporting electronics. For convenience, the terms "crystal" and "resonator" may be used interchangeably herein in referencing a resonating quartz crystal element. The first crystal changes frequency in response to changes in applied external pressure and temperature, while the output frequency of the second crystal is used to temperature compensate temperature-induced frequency excursions in the first and third crystals. The third crystal generates a reference signal, which is only slightly temperature dependent, against or relative to which the temperature and pressure-induced frequency changes in the first crystal and the temperature-induced frequency changes of the second crystal can be compared. Means for comparison as known in the art include frequency mixing or using the reference frequency to count the signals from the other two crystals. The first resonator is exposed via a fluid interface to the external pressure sought to be measured, and all three resonators are thermally coupled to the fluid to provide a rapid thermal response time. The transducer (crystals plus electronics) is calibrated as a complete unit over the intended pressure and temperature range so that all temperature and pressure related effects can be compensated for in the resulting calibration curve-fig coefficients. Exemplary patents for transducers using three crystal resonators, each assigned a function as described above, are U.S. Pat. No. 3,355,949 to Elwood, el al, and U.S. Pat. No. 4,802,370 to EerNisse, et al.

In the Elwood patent, the temperature crystal is used to provide a temperature readout and to compensate for temperature induced frequency changes in the pressure crystal. However, Elwood did not realize that pressure sensitivity of the pressure crystal is a function of the temperature of the crystal. Moreover, all three crystals in Elwood are disclosed as being relatively temperature sensitive, an attribute which makes it more difficult to compensate for temperature dependency of the pressure crystal. Finally, Elwood had no appreciation for the need to have the crystals free, or at least substantially free, of frequency anomalies or activity dips over the intended temperature range of the transducer and the need to have the three crystals have substantially no change in resistance with temperature. Activity dips can cause apparent pressure errors and resistance changes can cause the electronics to cease operation, to operate incorrectly, or require high drive levels.

The aforementioned EerNisse '370 patent isolates a temperature and a reference crystal from the applied external pressure, but all three crystals are temperature-sensitive, and EerNisse does not specifically define desired crystal cuts, (although the temperature resonator is specified as a torsional tuning fork resonator), nor did he specify required or preferred individual crystal performance specifications. The emphasis of the '370 patent is on mounting all three of the crystals in the pressure-transmitting fluid, and matching the heat transfer or conductivity characteristics, and thus the temperature response times, of the temperature and reference crystals to that of the pressure crystal to substantially eliminate temperature gradients produced either by external heating or by pressure-volume heating.

U.S. Pat. No. 4,660,420 to EerNisse recognizes the desirability of selecting a pressure crystal with a crystal cut having substantial independence from temperature-induced frequency changes over the intended range of temperatures, as well as a relatively large scale factor, i.e., greater frequency sensitivity to pressure changes in the range to be measured. For the pressure and temperature ranges experienced in oil and gas wells, an AT-cut quartz crystal is disclosed in EerNisse '420 to possess these attributes.

Another EerNisse patent, U.S. Pat. No. 4,550,610, attempted to select a crystal cut for a pressure crystal which minimized temperature effects, and recommended an SC-cut. However, it was subsequently discovered and disclosed in EerNisse '420 that the SC-cut impeded the ability of the transducer to respond to pressure stresses applied to the resonator housing.

Yet another EerNisse patent, U.S. Pat. No. 4,754,646, discloses the use of an integral housing and resonator section preferably formed from AT-cut, BT-cut, SC-cut or rotated X-cut quartz, but does not distinguish the performance characteristics of any of the various cuts, or recommend a particular cut. Rather, EerNisse '646 seeks to reduce resonator resistance and pressure hysteresis via particular physical configurations of the resonator and its area of joinder to the outer cylindrical shell.

U.S. Pat. No. 3,561,832 to Karrer, assigned to Hewlett-Packard Company, discloses the use of AT-cut and BT-cut quartz crystal thickness-shear mode resonators as pressure and reference crystals, but no temperature compensation is disclosed. In fact, the preferred methodology of the Karrer patent is to maintain the resonators at a constant temperature.

U.S. Pat. No. 3,617,780 to Benjaminson, also assigned to Hewlett-Packard Company, discloses AT-cut and BT-cut resonators for pressure transducers.

It is known to the inventors that certain third party suppliers, such as Clark Oilfield Measurement, Inc., of Tulsa, Okla., modify Hewlett-Packard pressure transducers by the addition of a temperature compensating device, commonly an RTD.

While prior art devices have attempted to address various deficiencies in individual elements of quartz resonator transducer design, those skilled in the art have failed to recognize that the overall design can be enhanced in a synergistic fashion through a judicious selection of quartz crystal characteristics for combined use in the transducer.

SUMMARY OF THE INVENTION

In contrast to the prior art, the present invention provides a superior quartz crystal resonator pressure transducer assembly comprised of three crystal resonators, each carefully selected for its role in the transducer and with the end result of the lowest probability of activity dips and resistance change while maintaining high precision and resolution in pressure measurement.

In the pressure transducer assembly of the present invention, the pressure crystal comprises a thickness-shear mode quartz crystal resonator selected to have small or no activity dips and to have its crystallographic orientation, or "cut", along the zero-temperature coefficient locus for the shear modes as defined by Bechmann, et al. "Higher-Order Temperature Co-efficients of the Elastic Stiffness and Compliances of Alpha-Quartz," *Proc IRE*, Vol. 50, August, 1962. The temperature crystal is a thickness-shear mode crystal selected from cuts having high stability with time and temperature, adequate temperature sensitivity over the intended range for the transducer, and no (or small) activity dips. The reference crystal is similar in characteristics to the temperature crystal, except that it should be of a cut selected to possess a minimal frequency-temperature response over the transducer design range, or a so-called "zero temperature coefficient" cut, and no (or small) activity dips.

In a preferred embodiment of the invention, the pressure crystal is selected from the AT-cut and BT-cut, the temperature crystal is selected from the AC-cut and BC-cut, and the reference crystal is selected from cuts in the vicinity of the SC-cut, including the SC-cut, the IT-cut, and the rotated X-cut. The reference crystal cut selection is somewhat dependent upon the temperature design range of the transducer.

In a most preferred embodiment of the present invention, the pressure crystal is an AT-cut crystal, the temperature crystal is an AC-cut crystal, and the reference crystal is an SC-cut crystal.

The most preferred physical configuration for the transducer of the present invention employs a pressure crystal assembly comprising a disc-shaped pressure crystal resonator section enclosed by two hollowed-out end caps, resonators of such design being disclosed in the aforementioned U.S. Pat. Nos. 3,561,832; 3,617,780; 4,550,610; 4,754,646; 4,660,420; 4,802,370 and in EerNisse, "Quartz Resonator Pressure Gauge: Design and Fabrication Technology," Sandia Laboratories Report No. SAND78-2264, (1978). The pressure crystal assembly is immersed in a pressure and temperature-transmitting fluid, while the temperature and reference crystals are thermally coupled to the fluid but isolated from the pressure by being mounted in a pressure-proof enclosure. Electronics, as well known in the art, are employed to drive the crystals, respond to their resonant frequency changes, and provide mixed frequency outputs representative of pressure (and temperature) data.

BRIEF DESCRIPTION OF THE DRAWINGS

The present invention will be more fully understood by one of ordinary skill in the art through a review of the following detailed description of the preferred embodiments in conjunction with the accompanying drawing, wherein.

DETAILED DESCRIPTION OF THE PREFERRED EMBODIMENTS

Figure 1:
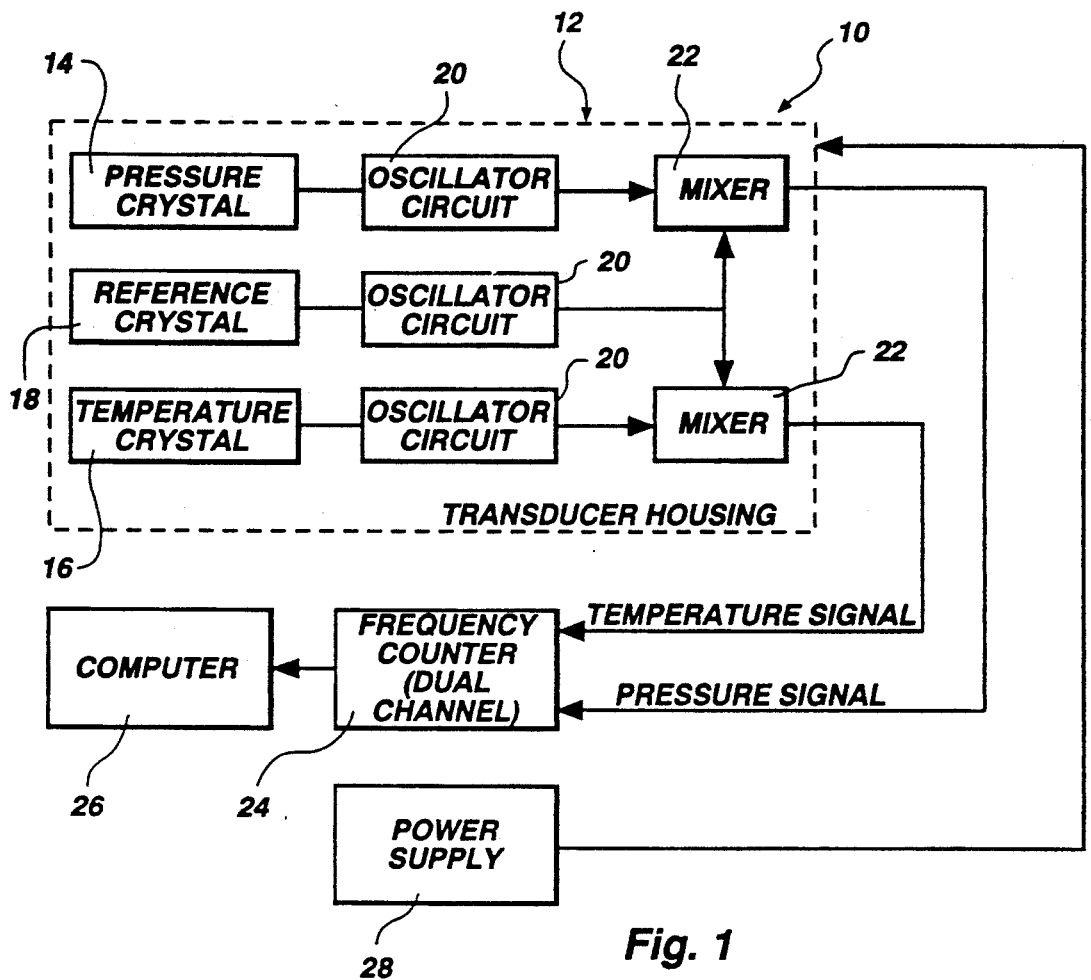
FIG. 1 comprises a block diagram of a transducer according to the present invention for pressure and temperature measurement.

Referring now to FIG. 1 of the drawings, there is depicted a transducer 10 for sensing pressure and temperature, and having utility, as noted above, for both downhole and surface applications. Transducer 10 includes electronics which drive and respond to the output of quartz crystal resonators. The electronics and resonators are preferably contained within a common housing, such as pressure housing 12, although this is not a requirement of the invention.

There are three resonators, including a pressure crystal 14, a temperature crystal 16 and a reference crystal 18. The pressure and temperature to be sensed are of a fluid (for purposes of this invention, fluid is defined as either the liquid or gaseous state) medium which is in thermal contact with all three crystal assemblies, but only the pressure crystal 14 is subjected to the pressure of the fluid: temperature crystal 16 and reference crystal 18 being intentionally isolated from pressure effects by their packaging and location.

The transducer electronics includes features well known in the art, such as oscillator circuits 20, and mixer circuits 22. The oscillator circuits 20 are coupled to electrodes associated with each of the quartz crystal resonators, piezoelectrically drive the quartz crystal resonators to vibrate in a manner well known in the art, and transmit the frequency output of the oscillators to mixer circuits 22. The mixed outputs are then transmitted to processor circuits, such as frequency counter 24, exterior to the transducer 10. The processor circuits receive the mixed frequency outputs of the crystals, and convert same to values representative of pressure and temperature data. The temperature output frequency is also employed to enhance the accuracy of the pressure data by compensating for temperature-induced frequency deviations of the pressure and reference crystals. Actual pressure and temperature data is developed via a computer 26 receiving output from frequency counter 24. Power for the transducer is supplied by a DC power supply 28, which may comprise batteries of any suitable power, voltage and temperature stability. In industrial or laboratory applications, the power supply may, of course, comprise a conventional DC power supply.

Figure 2:
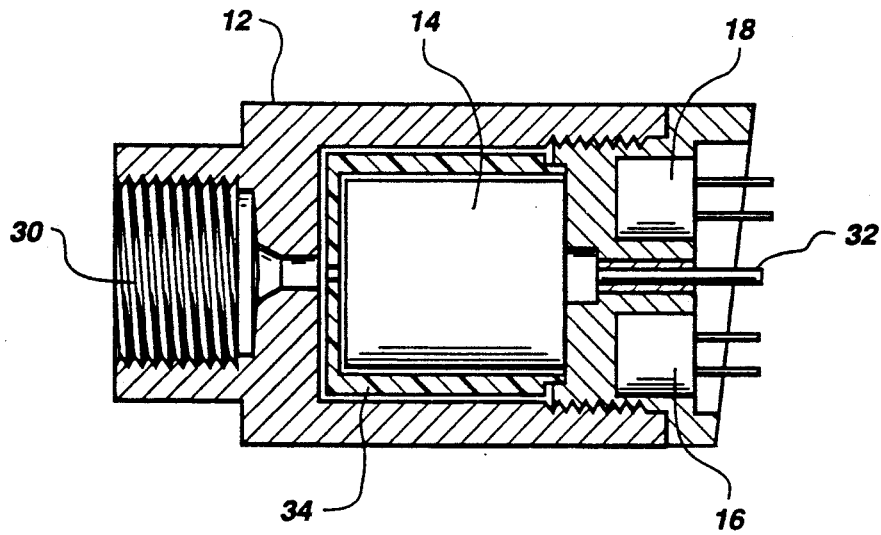
FIG. 2 comprises a schematic cross-sectional representation of the sensor arrangement of a transducer according to the present invention.

FIG. 2 depicts a suitable physical arrangement of crystals 14, 16 and 18 in transducer 10 wherein, as previously noted, pressure crystal 14 is exposed to fluid pressure via inlet 30, while temperature crystal 16 and reference crystal 18 are isolated from the pressure by housing 12, electrical feedthrough 32 for pressure crystal 14 being pressure proof. If desired, an electrically insulating spacer 34 may be placed about pressure crystal 14 to generally support same while permitting pressurized fluid access to substantially the entire exterior thereof.

The pressure crystal 14 is cut along the zero-temperature coefficient locus for the shear modes, as previously noted. This locus includes the AT, IT, SC, rotated-X, RT, and BT-cuts. Choice of a particular cut along this locus is dictated by a desire to optimize the frequency-temperature behavior of the resonator of the pressure crystal assembly over a given operating temperature range. For example, the AT-cut generally exhibits the smallest frequency excursion for temperature ranges centered about room temperature (20° C.) operation, while the IT, SC or rotated X-cuts are best for operating about 80°-90° C. However, as noted in the EerNisse '420 patent, the SC-cut is less preferred since it is less pressure-sensitive. As noted above, the pressure crystal is exposed to a pressurized fluid, preferably a clean fluid surrounding the pressure crystal to isolate it from the adverse effects of a corrosive environment, such as is experienced in a well bore of an oil and gas or geothermal well. The pressure crystal should not have any significant activity dips or frequency anomalies throughout the intended pressure and temperature operating range of the transducer, "significant" in this sense being defined as greater than 0.1 ppm (parts per million) frequency deviation. In addition, the pressure crystal should not exhibit large increases (factor of 1.5 or more) in resistance over the temperature range. The preferred orientation or cut for the pressure crystal would be the AT-cut or BT-cut, experience having shown that these cuts generally possess the best (lowest resistance) resonance characteristics, even though their frequency-temperature characteristics may not be optimum for a given temperature range. The most preferred orientation would be the AT-cut, as it exhibits less frequency change than the BT-cut over a large ($>100°$ C.) temperature range. While the temperature coefficient of span (change in frequency versus pressure at different temperatures) of the AT-cut is worse than that of the BT-cut, this is not a problem with the ability of the transducer to accurately measure and compensate for temperature. Activity dips of the AT-cut crystal, while occasionally discernable, are not usually substantial. Experience has shown that AT-cuts manufactured from man-made quartz exhibit smaller resistance changes over temperature than when made from natural quartz. However, sweeping natural quartz, as suggested and practiced by Hewlett-Packard, reduces the change in natural quartz. See for example, Kaitz, "Extended Pressure and Transducer Operation of BT-cut Pressure Transducers", *Proc. 38th Annual Frequency Control Symposium* (1984) and Kusters, et al., "Characteristics of Natural, Swept Natural, and Cultured X-and Z-Growth Quartz Material in High Temperature, High Stress Applications", *Proc. 39th Annual Frequency Control Symposium*, (1985).

The temperature crystal assembly 16 includes a temperature sensitive crystal, the frequency output of which is employed to temperature compensate the pressure crystal. The temperature crystal must exhibit high stability with time and temperature, have an adequate temperature sensitivity (normally greater than 10 ppm/°C.) and have no, or no substantial, activity dips and have small or no resistance change with temperature. It is also desirable that the temperature crystal be of small size and low cost, but these criteria do not form a part of the present invention. The AC-cut has a temperature sensitivity of about 20 ppm/°C. at about room temperature, which increases to about 30 ppm/°C. at around 200° C., so that an activity dip of 1 ppm would create a localized temperature error of less than 0.05° C. Both the AC and BC-cuts have zero coupling to the low-frequency face-shear modes, making them relatively free of frequency perturbations. Empirical testing via numerous frequency-temperature scans on AC-cut crystals have revealed no activity dips (to a resolution of $>0.1$ ppm) from 0°-200° C. as predicted by U.S. Pat. No. 2,173,589 to Mason. In contrast, the well known U-cut temperature sensor crystal has a very large temperature sensitivity—86 ppm/°C.—but is known to be plagued by activity dips. The AC and BC-cuts thus appear to be unique as the only thickness-shear mode crystal cuts having a large temperature sensitivity but no apparent activity dips, and are thus the preferred cuts for a temperature crystal for use with the transducer of the present invention. Stated another way, the AC- and BC-cuts appear to have zero coupling to every piezoelectrically driven mode except the desired thickness-shear mode, with the resulting phenomenon of a total lack of activity dips (unless mechanically induced) at any temperature. The most preferred cut at present is the AC-cut, based upon results obtained in empirical testing, BC-cut crystals not having been tested.

The reference crystal assembly 18 should include a crystal of the same characteristics of the temperature crystal, except that it should exhibit a minimal frequency-temperature response over the intended temperature range of use. For the range of 20°-180° C. the cut or orientation of choice is the SC-cut, having the ability to be selected (oriented) to have a maximum deviation of frequency versus temperature of ±20 ppm. Other cuts along the zero temperature coefficient locus and in the vicinity of the SC-cut have such temperature stability over similar temperature ranges. For example, the IT-cut could be optimized over 0°-150° C., and the rotated X-cut could be optimized over 0°-310° C. However, the SC-cut has proven over 20°-180° C. to be extremely immune to activity dips over the aforementioned temperature range, as they seldom occur and are typically less than 0.1 ppm in amplitude. Moreover, the SC-cut is the only cut in this family that is stress-compensated, a characteristic which helps reduce any thermal transient induced frequency errors. AT-cuts, when used as reference crystals, are plagued with activity dips, which makes the cut a poor choice for a reference crystal about room temperature, even though its frequency-temperature deviation about room temperature can be made superior to that of the SC-cut (when configured as a pressure sensitive crystal, the AT-cut does not exhibit substantial activity dips). Thus, the SC-cut is the preferred cut for a reference crystal to be employed in the transducer of the present invention.

While various combinations of thickness-shear mode crystals of different orientations are possible in a working transducer of the design disclosed herein, it is most preferred that the pressure crystal be of an AT-cut, the temperature crystal be of an AC-cut, and the reference crystal be of an SC-cut. This combination of crystals, each serving a special role, has been found to provide the lowest probability of activity dips and resistance change with temperature and therefore maximum performance of the transducer with the least amount of testing.

While the present invention has been described in terms of certain exemplary preferred embodiments, it will be readily understood and appreciated by one of ordinary skill in the art that it is not so limited, and that many additions, deletions and modifications to the preferred embodiments may be made within the scope of the invention as hereinafter claimed. In particular, while only specific combinations of pressure, reference and temperature crystals having cuts selected from those disclosed have been mentioned, it is contemplated that other combinations from the disclosed cuts may also be utilized.

What is claimed is:

1. A transducer assembly responsive to applied pressure, comprising:

first thickness-shear mode quartz crystal resonator means exposed to a fluid under said pressure for providing a frequency output responsive to variations therein;

second thickness-shear mode quartz crystal resonator means isolated from said pressure for temperature compensation of said pressure responsive frequency output;

third thickness-shear mode quartz crystal resonator means isolated from said pressure for providing a reference signal for said first and second quartz crystal resonator means; and means for causing said first, second and third quartz crystal resonator means to vibrate in said thickness-shear modes.

2. The apparatus of claim 1, wherein said second and third quartz crystal resonator means are thermally coupled to but are not subjected to the pressure of said fluid.

3. The apparatus of claim 1, wherein said first quartz crystal resonator means is of a crystallographic orientation selected from those cuts disposed along the zero temperature coefficient locus.

4. The apparatus of claim 3, wherein said crystallographic orientation is selected from the group comprised of the AT-cut and the BT-cut.

5. The apparatus of claim 4, wherein said selected cut comprises the AT-cut.

6. The apparatus of claim 4, wherein said selected cut comprises the BT-cut.

7. The apparatus of claim 1, wherein said second quartz crystal resonator means is of a crystallographic orientation selected from the group of cuts comprised of the AC-cut and the BC-cut.

8. The apparatus of claim 7, wherein said selected cut comprises the AC-cut.

9. The apparatus of claim 1, wherein said third quartz crystal resonator means is of a crystallographic orientation selected from those cuts disposed along the zero temperature coefficient locus.

10. The apparatus of claim 9, wherein said crystallographic orientation comprises the SC-cut.

11. The apparatus of claim 1, wherein said first and third quartz crystal resonator means are of orientations selected from those cuts disposed along the zero temperature coefficient locus.

12. The apparatus of claim 11, wherein said second quartz crystal resonator means is of an orientation selected from the group of cuts comprised of the AC-cut and the BC-cut.

13. The apparatus of claim 12, wherein said first quartz crystal resonator means is of an AT-cut.

14. The apparatus of claim 12, wherein said first quartz crystal resonator means is of a BT-cut.

15. The apparatus of claim 12, wherein said third quartz crystal resonator means is of an SC-cut.

16. The apparatus of claim 1, wherein said first, second and third quartz crystal resonator means are substantially free from activity dips.

17. The apparatus of claim 1, wherein said second quartz crystal resonator means is substantially free from activity dips.

18. The apparatus of claim 1, wherein said second quartz crystal resonator means is free from activity dips.

19. The apparatus of claim 1, wherein said first, second and third quartz crystal resonator means are substantially free from activity dips and have less than a 1.5X increase in resistance at 180° C. with respect to 20° C.

20. The apparatus of claim 1, wherein said second quartz crystal resonator means provides temperature compensation of said first and third quartz crystal resonator means.

* * * * *

UNITED STATES PATENT AND TRADEMARK OFFICE
CERTIFICATE OF CORRECTION

PATENT NO. : 5,231,880

DATED : 8/3/93

INVENTOR(S) : Roger W. Ward et al.

It is certified that error appears in the above-indentified patent and that said Letters Patent is hereby corrected as shown below:

In Column 1, line 11, insert a comma after "cifically";

In Column 1, line 44, change "curve-fig" to --curve-fit--;

In Column 1, line 47, change "el al," to --et al.,--;

In Column 5, line 39, change "X-and" to --X- and--; and

In Column 5, line 65, change "U-cut" to --Y-cut--.

Signed and Sealed this

Eighth Day of March, 1994

*Attest:*

BRUCE LEHMAN

*Attesting Officer*  *Commissioner of Patents and Trademarks*